Figure 1:
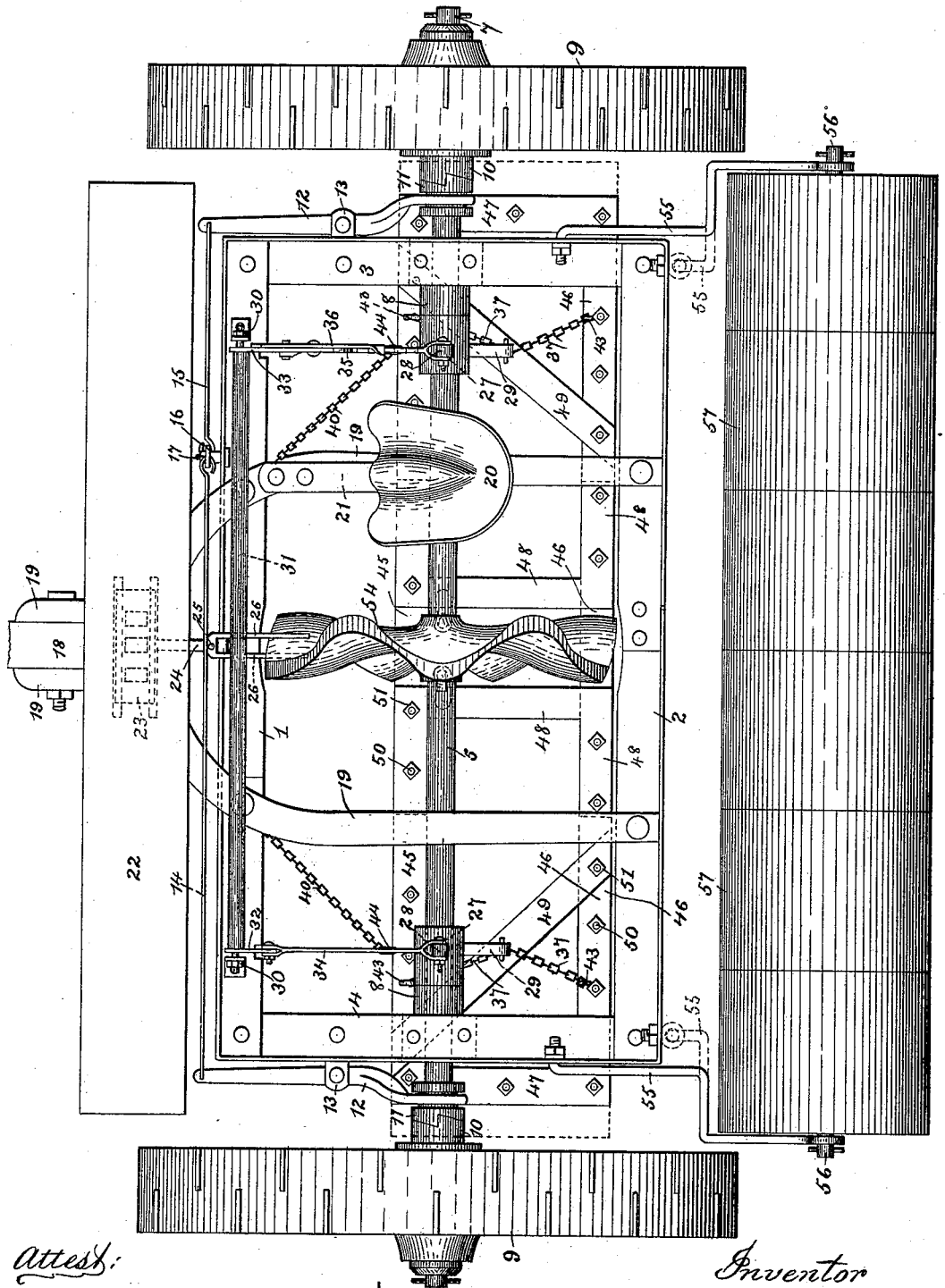
Figure 11:
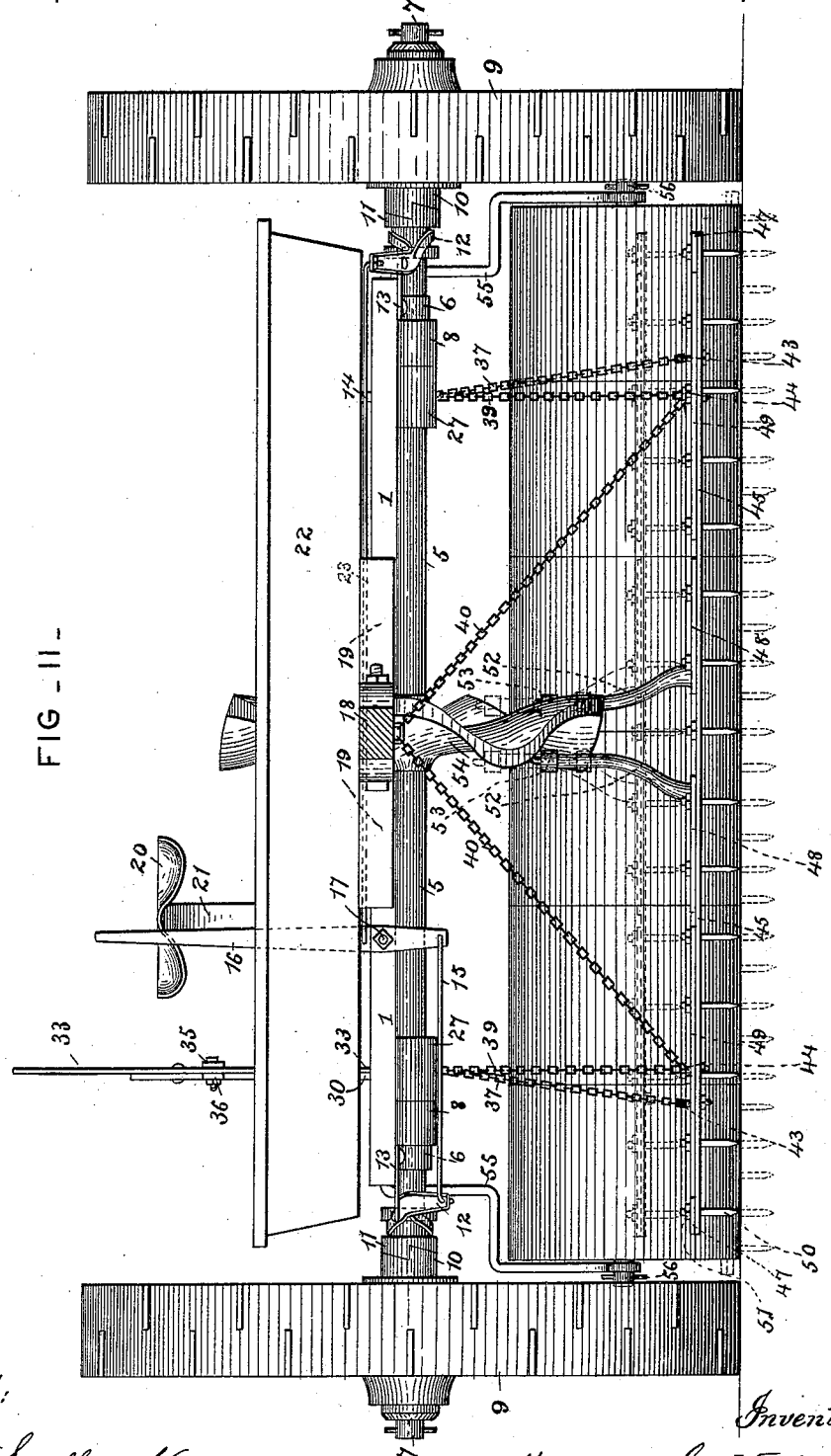

(No Model.)  W. G. MICHAEL.  3 Sheets—Sheet 1.
SEEDER, HARROW, AND ROLLER.
No. 400,351.  Patented Mar. 26, 1889.

Attest:
Geo. T. Smallwood
Walter Allen

Inventor
William G. Michael
By Knight Bros.
Attys

N. PETERS, Photo-Lithographer, Washington, D. C.

(No Model.) 3 Sheets—Sheet 2.

W. G. MICHAEL.
SEEDER, HARROW, AND ROLLER.

No. 400,351. Patented Mar. 26, 1889.

Attest:
Geo. T. Smallwood.
Walter Allen

Inventor
William G. Michael
By Knight Bros.
Attys

N. PETERS, Photo-Lithographer, Washington, D. C.

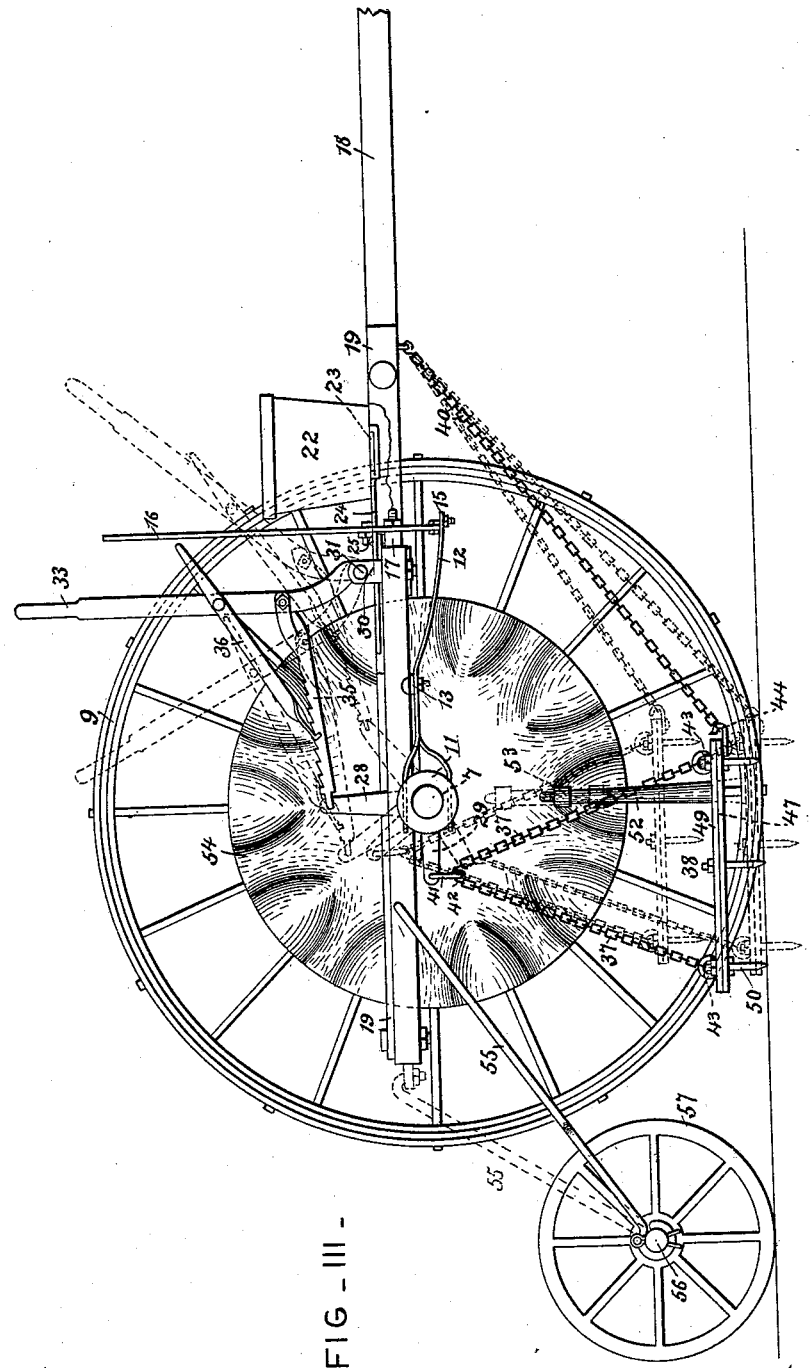

UNITED STATES PATENT OFFICE.

WILLIAM G. MICHAEL, OF HARRISON CITY, ASSIGNOR OF TWO-THIRDS TO LOW W. BOTT AND M. L. PAINTER, OF GREENSBURG, PENNSYLVANIA.

SEEDER, HARROW, AND ROLLER.

SPECIFICATION forming part of Letters Patent No. 400,351, dated March 26, 1889.

Application filed June 4, 1888. Serial No. 275,995. (No model.)

*To all whom it may concern:*

Be it known that I, WILLIAM G. MICHAEL, a citizen of the United States, residing at Harrison City, in the county of Westmoreland and State of Pennsylvania, have invented an Improvement in a Combined Seeder, Harrow, and Roller, of which the following is a specification.

My invention relates to those combined seeders, harrows, and rollers in which the seed-slide and harrow are vibrated by a cam-wheel common to both.

My improved implement comprises an angle-iron main frame of quadrangular form, a tongue or pole having supporting-arms at its rear end bolted to the front and rear of the frame, a seed trough or hopper secured to the arms having a reciprocating seed-slide, a drive-axle journaled in bearings secured to the under side of the main frame, supporting-wheels, each wheel having the fixed member of a clutch secured to the hub thereof, loose members of the clutches on the drive-axle, operating hand-lever having connecting-rods and clutch-levers pivoted to the frame, bell-crank levers mounted on the axle, harrow braced by chains to the pole or tongue and suspended by chains on the lower arms of the bell-crank levers, having posts provided with rollers, a rock-shaft journaled in brackets on the front part of the main frame having a crank-arm at one end and a hand-lever at the other end having a bifurcated pawl, rod connecting the upper arm of one of the bell-crank levers with the crank-arm, ratchet-bar with which the pawl engages connecting the upper arm of the other bell-crank lever with the hand-lever, a central cam or serpentine wheel keyed to the axle and working between the arms of the pivoted bar of the seed-slide and between the posts of the harrow for vibrating the seed-slide and harrow, and a sectional roller turning loosely on an axle connected by rods with the main frame.

My invention consists in certain features of construction, hereinafter described, and pointed out in the claims.

In order that my invention may be fully understood, I will proceed to describe it with reference to the accompanying drawings, in which—

Figure I is a top view of my improved combined seeder, harrow, and roller, the parts being in normal position. Fig. II is a front view thereof, different positions of the harrow being shown in dotted lines. Fig. III is a side view of the same, the off wheel being omitted and the lowered and elevated positions of the harrow being shown in dotted lines.

The main frame is in shape of quadrangular form, constructed of plates of angle-iron riveted or bolted together, having front plates, 1, rear plates, 2, and side plates, 3 and 4.

5 is a drive-shaft or drive-axle mounted in bearings 6, bolted to the under side of the side plates and having spindles 7. Collars 8 are secured to the axle on the inside of the bearings to prevent movement of the axle or shaft endwise. Mounted loosely on the spindles are the drive and supporting wheels 9, each wheel having rigidly secured to its hub around the axle or shaft the fixed member 10 of the clutches.

11 are the loose members of the clutches, sliding on the axle or shaft. The loose members are shifted by clutch-levers 12, pivoted to horizontal brackets 13, secured to the side plates. The free ends of the clutch-levers are connected by rods 14 and 15 to an operating-lever, 16, respectively below and above the fulcrum-stud 17 of the latter, secured to the front of the main frame.

18 is the tongue or pole, bolted to arms 19, forming a support thereto, said arms extending rearwardly, where they are secured by bolts to the front and rear plates of the main frame. On one of these arms is secured the standard 21, on which is supported the driver's seat 20, and on the front part of the arm is secured the seed trough or hopper 22, having a seed-slide, 23, operated by a swinging bar, 24, pivoted on a stud, 25, secured to the front plate of the main frame and having a pair of arms, 26, extending rearwardly.

27 are bell-crank levers mounted on the drive-axle between the collars 8 and arms 21, each having an upper arm, 28, and a lower arm, 29. Journaled in brackets 30, bolted on the front part of the main frame, is a rock-shaft, 31, having at one end a crank-arm, 32, and at the other end a hand-lever, 33.

Connecting the upper arm of one of the bell-crank levers with the crank-arm is bolted a rod or pitman, 34, and coupling the upper arm of the other bell-crank lever with the hand-lever is bolted a ratchet-bar, 35, whose teeth are engaged by a bifurcated pawl, 36, pivoted to the hand-lever. Suspended from the lower arms of the bell-crank levers by chains 37 is a harrow or drag, 38, braced by chains 39, also connected to the lower arms of the bell-crank levers, and also braced by chains 40 to the tongue or pole. The lower arms of the bell-crank levers are each provided with a ring, 41, to which the suspension-chains are connected by hooks 42, and the harrow is provided with eyebolts 43, with which the lower ends of the suspension-chains are connected.

44 are hooks by which the pole or tongue chains are adjustably connected. The harrow is constructed of flat bars in quadrangular form, having front bar, 45, rear bar, 46, end bars, 47, bridge-bars 48, and brace-bars 49. The harrow is provided with teeth 50, secured by nuts 51.

52 are upwardly-extending inwardly-bent posts bolted or otherwise rigidly secured to the bridge-bars, having rollers 53 at their upper ends, between which rotates a cam or serpentine wheel, 54, keyed to the drive-axle. The cam or serpentine wheel also rotates between the arms of the swinging bar of the seed-slide to impart a reciprocating movement to the latter. The harrow being in its elevated position, the cam-wheel rotates freely between the posts, the rollers being within the cams; but as soon as the harrow is lowered the rollers are brought in contact with the cams and cause the harrow to vibrate. The harrow is raised and lowered by means of the hand-lever 33, and is retained at the desired height by the pawl pivoted thereto and the ratchet-bar connecting it with an upper arm of a bell-crank lever.

Secured either to the side plates of the main frame, as shown in full lines, or to the rear plate thereof, as shown in dotted lines, by means of bent rods 55 and shaft 56, is a sectional roller, 57, which follows the harrow.

Having thus described my invention, the following is what I claim as new therein and desire to secure by Letters Patent:

1. The combination of the main frame, the drive-axle, the supporting-wheels, the rearwardly-extending arms secured to the front and rear plates of the main frame, the seed-hopper secured to the arms in front of the main frame, having a seed-slide, the swinging bar pivoted to the main frame, connected with the seed-slide, and having rearwardly-extending arms, and a cam-wheel fixed to the axle and working between the arms of the swinging bar, substantially as described and shown.

2. The combination of the main frame, the drive-axle, the bell-crank levers mounted on the axle, having upper and lower arms, the rock-shaft having a crank-arm at one end and a lever at the other end, a pitman connecting the crank-arm with one of the upper arms, a ratchet-bar connecting the lever with the other upper arm, a pawl pivoted to the lever and engaging the ratchet-bar, a harrow-frame, and chains by which the harrow-frame is suspended from the lower arms, substantially as described and shown.

3. The combination of the main frame, the drive-axle having a cam-wheel, the harrow-frame, the bell-crank levers by which the harrow-frame is suspended underneath the drive-axle, having vertical posts between which the cam-wheel works, and lever mechanism connected with the bell-crank levers, substantially as described and shown.

4. The harrow-frame constructed with a front bar, 45, rear bar, 46, end bars, 47, bridge-bars 48, and brace-bars 49, substantially as shown and described.

WILLIAM G. MICHAEL.

Witnesses:
D. C. MORRIS,
L. W. GONGEMARE.